3,200,039
NON-GRANULATED TABLETS WITH 20% SORBITOL IN A PARTICLE SIZE OF FROM ABOUT 100µ TO ABOUT 2000µ
Herbert Thompson, Jr., Amityville, N.Y., assignor to Chas. Pfizer & Co., Inc., New York, N.Y., a corporation of Delaware
No Drawing. Filed May 28, 1962, Ser. No. 197,863
6 Claims. (Cl. 167—82)

This invention relates to the production of troches and tablets of therapeutic and nutritional materials.

In the pharmaceutcial industry, it is a well-known fact that very few crystalline or powdered materials can be compressed into suitable tablets on automatic tabletting equipment in their original crystalline or powdered form. The practice has developed of first preparing a granulation of the material, because it is known that the granular structure thus formed is suitable for compression into tablets. There are two well-known methods of preparing a granulation, namely, the wet granulation process and the dried granulation process which is also known as "slugging."

The method of preparing granules according to the wet granulation process consist of moistening the dry powder with or without the addition of an adhesive substance until the whole is converted into a crumbling mass. The mass is then forced through a screen to reduce the material to small compressed granules. The most commonly used moistening agent is, of course, water, although other solvents such as alcohol are well known for this purpose. It is also common practice to add an adhesive substance such as gelatin, starch or gum acacia in order to assist in the formation of the granules.

The method of preparing granules according to the dry granular process consist of pre-compressing the dried powder into oversized tablets or "slugs." These oversized tablets or slugs are then broken into granules of substantially uniform size and re-compressed into tablets or troches.

The present invention is based on the discovery that the addition of not less than about 20% by weight of sorbitol with a particle size of from about 100 to about 2000 microns to crystalline or powdered materials renders them capable of being compressed directly into suitable tablets on automatic tabletting equipment. The present invention completely eliminates the necessity of first preparing a granulation of crystalline or powdered material before compressing them into tablets. In the tabletting art, the elimination of the necessity of first preparing a granulation results in a host of economical advantages. Insofar as the wet granulation process is concerned, the wet mixing, drying, and the screening operations are eliminated. Insofar as the dry granulation process is concerned, the pre-compression, breaking and screening operations are eliminated. In both cases, the amount of equipment, labor and space needed is vastly reduced. Furthermore, since by practicing the present invention, a compressed tablet can be made eliminating all but the steps of mixing and compressing, there results a great saving of time.

The present invention, is especially useful in the preparation of troches. The slow disintegration that is required in a troche can only be achieved by a high degree of binding which normally is obtained only after one of the two aforementioned granulating processes is employed. Sorbitol, it was surprising to find, on direct compression had excellent binding properties. Troches of sufficient hardness to give an oral dissolution rate from about 5 to about 10 minutes could readily be achieved with this material. It was found that troches which contained sorbitol could be made with a hardness that exceeded the 20 K scale as measured by the Pfizer Hardness Tester (U.S. Patent 2,975,630 issued to Frank Michel).

When these troches are made somewhat softer, from about 4 to about 8 K, they may be employed as chewable tablets. A further advantage of using sorbitol as an excipient in these troches and chewable tablets is its excellent masking properties for bitter tasting medicaments, for example, antibiotics, vitamins, etc. Sorbitol may also be used as a tablet excipient for the direct compression of tablets which are to be swallowed as such. When sorbitol is employed in this manner, it is usually advantageous to also employ a tablet disintegrant such as starch or alginic acid. In this manner, tablets can be obtained which will rapidly dissolve in gastric juice and be readily available for systemic absorption.

In practicing the present invention, the therapeutic materials to be tabletted may be mixed directly with the sorbitol or they may be dissolved in a solvent and the resulting solution mixed with the sorbitol after which evaporation of the solvent is effected. Thereafter, the materials are thoroughly admixed and compressed. The maximum proportion of sorbitol which may be employed in practicing the present invention may be very close to 100% by weight in the case of these medicaments which are administered in small amounts.

In practicing the present invention, lubricants such as magnesium stearate and calcium stearate, fillers such as lactose, distintegrants such as starch or alginic acid, colorants such as F, D & C and D & C dyes, sweetening agents such as sodium D-saccharate and/or sodium cyclamate and flavors may be added to the mixture of sorbitol and the crystalline or powdered therapeutic material prior to tabletting on the automatic tabletting equipment.

This invention is further illustrated by the following examples which are not to be construed as imposing any limitation on the scope thereof. On the contrary, it is to be clearly understood that resort may be had to other various embodiments, modifications and equivalents thereof which readily suggest themselves to those skilled in the art without departing from the spirit of the present invention and scope of the appended claims.

EXAMPLE I.—DOUBLE ANTIBIOTIC ANESTHETIC TROCHES

To 140 g. of sorbitol there was added 15 ml. of a 4% F, D & C red No. 4 aqueous dye solution and the mixture was admixed until the dye was thoroughly dispersed. Thereafter, the moist mixture was dried in a "Proctor-Swartz" forced convection oven at 50° C. until the moisture content of the solid was reduced to approximately 1%. The dried solid was then micronized in a Bantam micropulverizer using a 0.010″ herringbone plate. The resulting powder was admixed with:

| | Amount/1000 tablets |
|---|---|
| Powdered polymyxin B sulfate _____units___ | 1,150,000 |
| Powdered bacitracin _____do____ | 57,500 |
| Powdered benzocaine _____grams__ | 5.1 |
| Sodium D-saccharate _____do____ | 1 |
| Sodium cyclamate _____do____ | 10 |
| Orange flavor _____do____ | 7 |
| Magnesium stearate _____do____ | 45 |
| Sorbitol _____do____ | 1260 | and the mixture was passed through a comminuting machine (Fitzpatrick model D) at low speed with knives forward through a 40 mesh screen. This powder was then blended for approximately one hour in a twin shell blender and then compressed into 1.5 g., 5/8" flat beveled troches at maximum hardness on a rotary tabletting machine. In this manner, stable, good tasting, slow dissolving troches were obtained.

Analysis of the polymyxin B sulfate and bacitracin potency after these tablets wree subjected to a temperature of 37° for 11 weeks indicated a 100% potency retention for the former and a 70% potency retention for the latter antibiotic.

EXAMPLE II.—TRIPLE ANTIBIOTIC ANESTHETIC TROCHES

Employing the procedure as described in Example I, 1000 troches containing the following materials were produced.

| Ingredients: | Amount/1000 tablets |
|---|---|
| Powdered neomycin _____grams__ | 5.8 |
| Powdered polymyxin B sulfate __units__ | 1,150,000 |
| Powdered bacitracin _____do____ | 57,500 |
| Powdered benzocaine _____grams__ | 5.1 |
| Sodium D-saccharate _____do____ | 1 |
| Sodium cyclamate _____do____ | 10 |
| Sorbitol _____do____ | 1400 |
| Wild cherry _____do____ | 7 |
| F, D & C red No. 4 _____do____ | .6 |
| Magnesium stearate _____do____ | 45 |

These troches weighed 1.5 g., were in the form of a 5/8" flat beveled tablet, exhibited good stability, good taste and a slow dissolution rate.

The stability of the antibiotics in the aforesaid troches after 11 weeks at 45° C. was as follows: neomycin, 100%; polymyxin B sulfate, 100%; and bacitracin, 76% retention of initial potency.

EXAMPLE III.—ANTI-TUSSIVE ANESTHETIC TROCHES

Again employing the procedure of Example I, 1000 troches of the following ingredients were produced:

| Ingredients: | Amount/1000 tablets (grams) |
|---|---|
| Powdered carbetapentane tanate _____ | 8.35 |
| Powdered benzocaine _____ | 5.1 |
| Sodium D-saccharate _____ | 1 |
| Sodium cyclamate _____ | 10 |
| Sorbitol _____ | 1400 |
| Lemon flavor _____ | 7 |
| F, D & C yellow No. 5 _____ | 0.6 |
| Magnesium stearate _____ | 45 |

These troches weighed 1.5 g. each, were in the form of a 5/8" flat beveled tablet, exhibited good stability, good taste and a slow dissolution rate.

The stability of carbetapentane tanate in the aforesaid troches is indicated by the following data: after 3 weeks at 45° C.—97% retention of potency; after 11 weeks at 45° C.—104% retention of potency and after 16 weeks at 45° C.—103% retention of potency.

EXAMPLE IV.—CHEWABLE VITAMIN TABLET

To 100 g. of corn starch, there as added 25 ml. of a 2% F, D & C yellow No. 6 aqueous dye solution and the mixture was stirred until the dye was thoroughly dispersed. Thereafter, the moist mixture was dried in a "Proctor-Swartz" forced convection oven at 75° until the moisture content of the dyed starch was reduced to approximately 1%. The dyed solid was then milled through an N 000 round hole plate in a Fitzpatrick model D comminuting mill running at high speeds with hammers forward. This powder was admixed with:

| Ingredients: | Amount/1000 tablets |
|---|---|
| Crystalline vitamin A acetate ____units__ | 5,000,000 |
| Crystalline vitamin D$_2$ _____do____ | 500,000 |
| Powdered thiamine mononitrate__grams__ | 1.15 |
| Powdered riboflavin 5' phosphate _do____ | 2.42 |
| Powdered pyridoxine HCl _____do____ | 1.10 |
| Vitamin B$_{12}$ (as 1% resin adsorbate) _____do____ | 0.22 |
| Powdered ascorbic acid _____do____ | 27.50 |
| Powdered sodium ascorbate _____do____ | 34.10 |
| Powdered niacinamide _____do____ | 10.50 |
| Powdered calcium pantothenate __do____ | 2.50 |
| Sodium cyclamate _____do____ | 9.00 |
| Sodium saccharin _____do____ | 1.00 |
| Orange flavor _____do____ | 4.00 |
| Sorbitol _____do____ | 600 |
| Calcium stearate _____do____ | 25 | and the resulting mixture passed through a 20 mesh screen in a Fitzpatrick mill at low speed with knives forward. This powder was then blended for approximately one hour in a twin shell blender and compressed into 0.832 g., 1/2" flat, beveled troches at a hardness of 6 to 7 Kg. (measured on a Pfizer Hardness Tester) on a rotary tablet machine. In this manner, a stable, good tasting, orange flavored, chewable tablet was obtained.

EXAMPLE V.—CHEWABLE VITAMIN TABLET

Employing the procedure described in Example IV, 1000 chewable tablets containing the following materials were manufactured.

| Ingredients: | Amount/1000 tablets |
|---|---|
| Crystalline vitamin A _____units__ | 5,000,000 |
| Crystalline vitamin D _____do____ | 500,000 |
| Powdered thiamine mononitrate _grams__ | 1.15 |
| Powdered riboflavin 5' phosphate _do____ | 2.42 |
| Powdered pyridoxine HCl _____do____ | 1.10 |
| Vitamin B$_{12}$ (as 1% resin adsorbate) _____do____ | 0.22 |
| Powdered ascorbic acid _____do____ | 27.50 |
| Powdered sodium ascorbate _____do____ | 34.10 |
| Powdered niacinamide _____do____ | 10.50 |
| Powdered calcium pantothenate __do____ | 2.50 |
| Sodium cyclamate _____do____ | 9.00 |
| Sodium saccharin _____do____ | 1.00 |
| Lemon flavor _____do____ | 4.00 |
| Yellow No. 5 _____do____ | 0.50 |
| Corn starch (1% moisture) _____do____ | 100 |
| Sorbitol _____do____ | 600 |
| Calcium stearate _____do____ | 25 |

These tablets weighed 0.832 g. each, were in the form of a 1/2" flat beveled tablet and exhibited a hardness of 6 to 7 Kg. on the Pfizer Hardness Tester.

These good tasting, lemon flavored, chewable tablets displayed excellent vitamin stability. The stability data obtained for these vitamins is shown in Table I.

Table I

| Indgredients | Percent Retention at 45° C. | |
|---|---|---|
| | 3 Weeks | 6 Weeks |
| Crystalline vitamin A | 86 | 80 |
| Crystalline vitamin B$_1$ | 97 | 97 |
| Powdered vitamin B$_2$ | 94 | 94 |
| Powered vitamin B$_6$ | 90 | 99 |
| Powdered vitamin C | 92 | 89 |
| Powdered niacinamide | 112 | 105 |
| Vitamin B$_{12}$ (as 1% resin adsorbate) | | 96 |
| Powdered calcium panthothenate | | 92 |

EXAMPLE VI.—ASCORBIC ACID TABLETS

A mixture of 525 g. of vitamin C, 250 g. of sorbitol, 100 g. of corn starch and 100 g. of micropulverized polyethylene glycol 6000 was blended for one hour in a twin shell blender. Thereafter, this powder was directly compressed into 0.975 g., ½" scored tablets at a hardness of 6 to 8 Kg. on a tabletting machine. In this manner, tablets were obtained which could be swallowed intact. These tablets when added to gastric juice at 37° C. disintegrated within 10 minutes.

EXAMPLE VII.—VITAMIN A TABLETS

A mixture of 360 g. of crystalline vitamin A acetate, 1000 g. of sorbitol and 26 g. of magnesium stearate were blended for one hour in a twin shell blender. Thereafter, this mixture was directly compressed to form tablets of vitamin A which weighed 1.38 g. each and were in the form of a ⅝" flat tablet. These tablets were compressed to a maximum hardness when manufactured on the rotary tablet machine and were shown to have adequate dissolution when employed as a vitamin A buccal tablet.

The stability of vitamin A in these tablets was shown to be as follows: 2 weeks at 45° C.—92% potency retention; 4 weeks at 45° C.—98% potency retention and after 12 weeks at 45° C.—81% potency retention.

What is claimed is:

1. A process of preparing tablets of powdered therapeutic materials comprising the steps of forming a uniform non-granulated mixture of powdered therapuetic material with not less than about 20% by weight of sorbitol having a particle size of from about 100μ to about 2000μ and compressing the non-granulated mixture thus obtained into tablets.

2. A therapeutic tablet obtained by compressing a uniform non-granulated mixture comprising a powdered therapeutic material and not less than about 20% by weight of sorbitol having a particle size of from about 100μ to about 2000μ prepared in accordance with claim 1.

3. A therapeutic tablet as claimed in claim 2 wherein the active therapeutic material is a vitamin.

4. A thereapeutic tablet as claimed in claim 2 wherein the active therapeutic material is an antibiotic.

5. A therapeutic tablet as claimed in claim 2 wherein the active therapeutic material is an anesthetic.

6. A therapeutic tablet as claimed in claim 2 wherein the active therapeutic material is an antitussive.

References Cited by the Examiner

UNITED STATES PATENTS

| | | | |
|---|---|---|---|
| 2,315,699 | 4/43 | Goepp | 260—637 |
| 2,483,254 | 9/49 | Almy | 34—5 |
| 2,594,863 | 4/52 | Buck et al. | 260—637 |
| 2,793,979 | 5/57 | Svedres et al. | 167—82 |
| 2,807,559 | 9/57 | Steiner | 127—30 |
| 2,841,528 | 7/58 | Myhre | 167—82 |
| 2,878,160 | 3/59 | Smedresman | 167—82 |
| 2,887,436 | 5/59 | Klioze et al. | 167—81 |
| 2,887,437 | 5/59 | Klioze et al. | 167—81 |
| 2,887,439 | 5/59 | Klioze et al. | 167—82 |
| 2,944,029 | 7/60 | Jones et al. | 252—305 |
| 2,996,431 | 8/61 | Barry | 167—82 |
| 3,012,893 | 12/61 | Kremzer et al. | 99—134 |
| 3,079,303 | 2/63 | Raff et al. | 167—82 |
| 3,084,104 | 4/63 | Tuerck et al. | 167—82 |
| 3,089,824 | 5/63 | Wurster | 167—82 |

OTHER REFERENCES ("A.D.I.") American Drug Index, 1961, Wilson et al., published 1961 by J. B. Lippincott Co., Philadelphia, Pa.; entry, "Bacitracin," pp. 107–108; entry, "Benzocaine," pp. 125–126; entries, "Candettes"—"Candettes lozenges," p. 164; entries, "Neomycin base"—"Neomycin sulfate," pp. 482–485; entries, "Polymyxin B"—"Polymyxin B sulfate," pp. 580–581.

LEWIS GOTTS, *Primary Examiner.*

IRVING MARCUS, *Examiner.*